United States Patent [19]

Golden et al.

[11] 4,121,176
[45] Oct. 17, 1978

[54] ATOMIC AND MOLECULAR RESONANCE LASER

[76] Inventors: David E. Golden, 3810 Stockwell, Lincoln, Nebr. 68506; Stephan M. Ormonde, P.O. Box 8575, Albuquerque, N. Mex. 87108

[21] Appl. No.: 771,052

[22] Filed: Feb. 22, 1977

Related U.S. Application Data

[63] Continuation of Ser. No. 586,690, Jun. 13, 1975, abandoned.

[51] Int. Cl.$^2$ .............................................. H01S 3/22
[52] U.S. Cl. ......................... 331/94.5 G; 331/94.5 PE
[58] Field of Search ..................... 331/94.5 G, 94.5 P

[56] References Cited

U.S. PATENT DOCUMENTS 3,789,319  1/1974  Rhodes ........................... 331/94.5 G

*Primary Examiner*—William L. Sikes
*Attorney, Agent, or Firm*—Townsend and Townsend

[57] ABSTRACT

Method and apparatus for generating electromagnetic energy by creating a population inversion between upper and lower energy levels in a target substance. The population inversion is maintained by exciting the individual particles to a short lived resonant negative ion-like state and then to a particular neutral state at a rate greater than the total rate of decay from the resonant negative ion-like state to the various lower energy levels. Particles in the resonant negative ion-like state decay quickly to at least two energy states at differential rates, with decay to the upper energy state occurring at a rate sufficiently greater than decay to the lower energy state to ensure population inversion. Atoms or molecules in the upper state decay to the lower state, emitting coherent radiation of a predetermined frequency and wave length.

Excitation of the particles to the short lived resonant negative ion-like state is produced by irradiating the target substance with a beam of electrons having an energy distribution centered about a resonant energy at which the individual particles respond, the energy distribution having a width of about 0.25 to about 5.0 eV. The power output may be varied by varying the current density of the electron beam, and the energy output may be either continuous or pulsed by controlling the application of the incident electron beam in a corresponding fashion.

8 Claims, 5 Drawing Figures

U.S. Patent   Oct. 17, 1978   Sheet 1 of 2   4,121,176
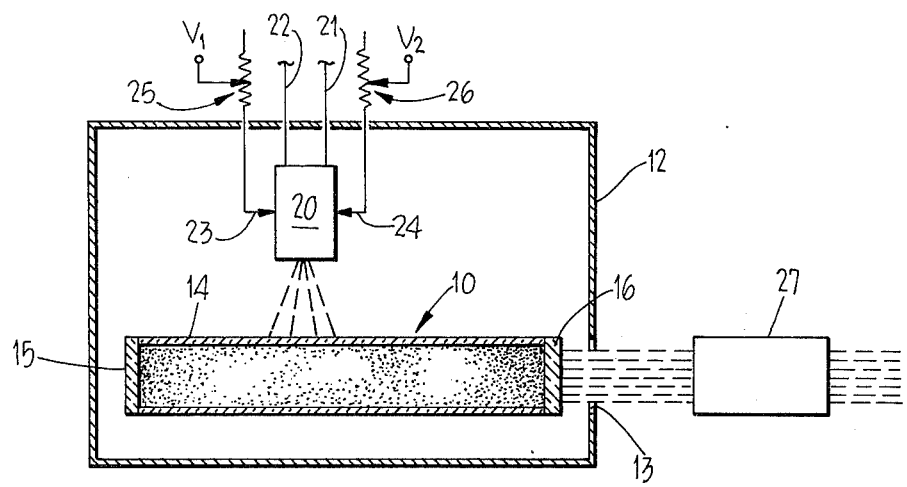
Fig_1
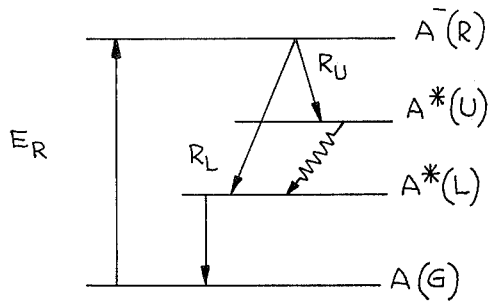
Fig_2
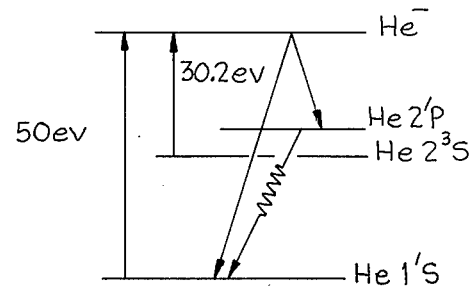
Fig_3
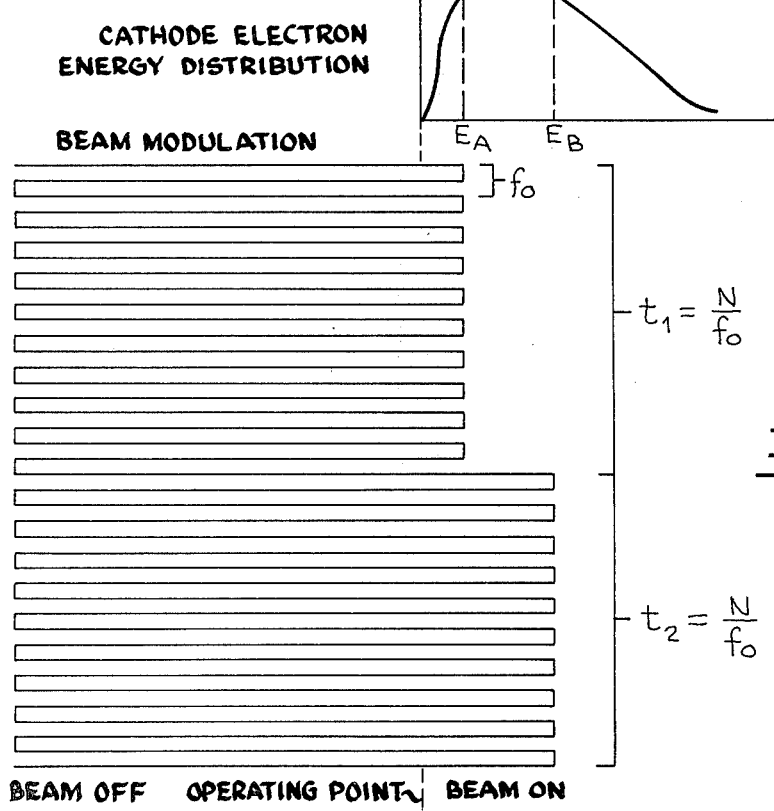
Fig_5

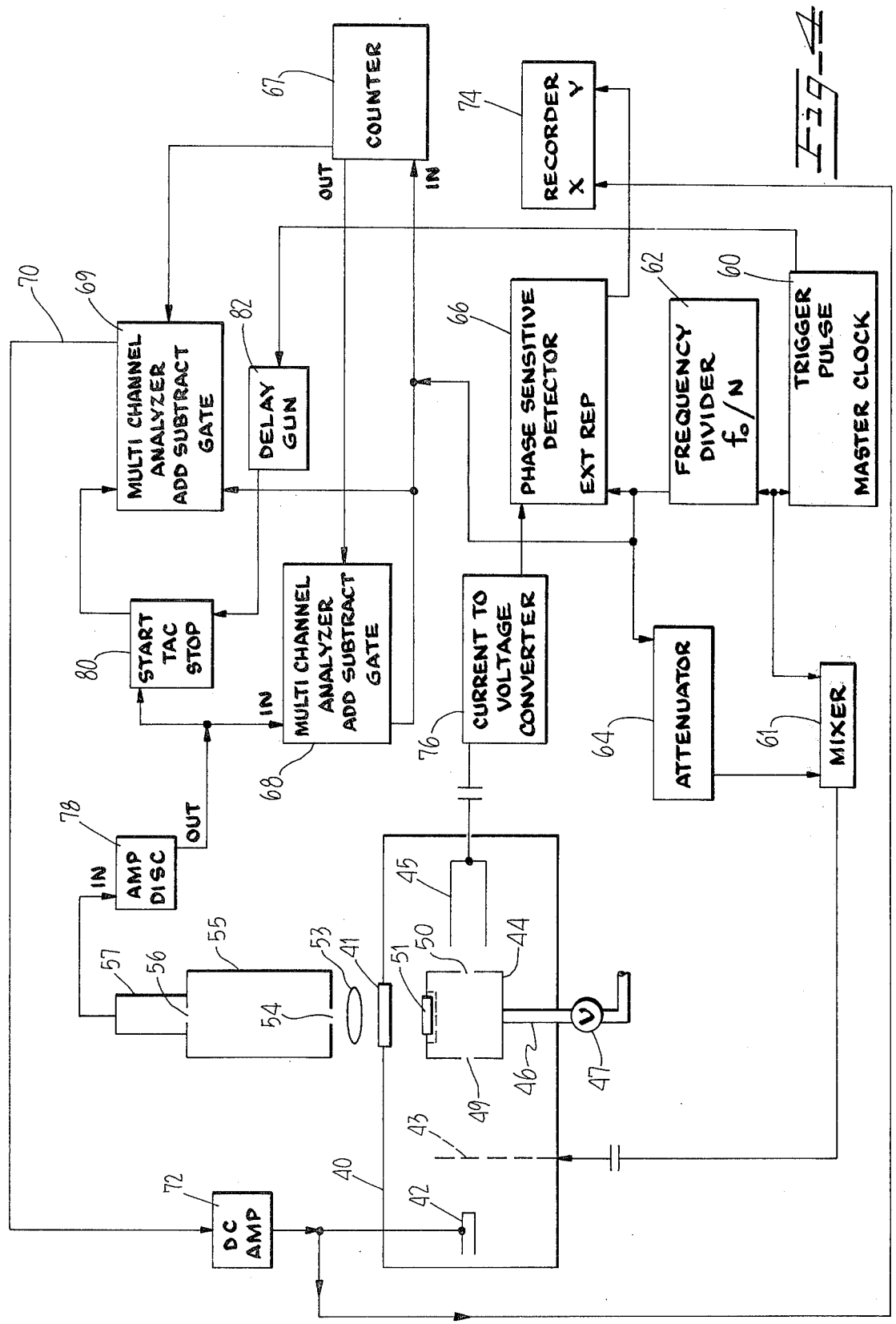

ATOMIC AND MOLECULAR RESONANCE LASER

This is a continuation of application Ser. No. 586,690, filed June 13, 1975 now abandoned.

BACKGROUND OF THE INVENTION

This invention relates to the generation and amplification of radiation by stimulated emission. Devices for generating radiation by stimulated emission are commonly termed optical masers or lasers.

Lasers are commercially available which employ the principle of stimulated emission of radiation to generate monochromatic light radiation. The principles by which this type of device operates are disclosed in U.S. Pat. Nos. 2,929,922 to Schawlow et al, and 2,879,439 to Townes, and elsewhere in literature and are generally well understood. Briefly, a lasing medium, consisting of atoms or molecules, is pumped with radiation from an external source, such as a light source, in order to produce a population inversion in which the ratio of the total number of atoms or molecules in a higher energy level to the total number of atoms or molecules in a lower energy state is greater than the same ratio when the medium is in a state of equilibrium. The atoms or molecules in the higher energy level spontaneously decay to one or more lower levels, resulting in the emission of radiation of characteristic frequency. The spontaneous decay of atoms or molecules in turn stimulates the decay of other atoms or molecules in the higher level, and, so long as the population inversion is maintained, this stimulated emission of radiation continues to occur and results in the generation of coherent light having a wavelength determined by the characteristic frequency.

There are many potential applications for lasers which have yet to be exploited due to severe limitations inherent in known devices. For example, in the medical fields of microbiological analysis and surgery, lasers have many potential uses and applications. Ideally, when used as an analytical tool for microbiological analysis, the laser should ideally comprise a low power device having extremely high resolution and tunability over a relatively wide range of wavelengths. Currently available lasers used for this purposes, however, typically possess a lower limit on the emitted spectra of about 3,000 angstrom units. This limitation precludes the exploration of many organic compounds having spectra lying below 3,000 angstrom units and neural filaments whose size is in the 100–800 angstrom range. When used as a surgical tool, on the other hand, the laser should ideally comprise a device capable of generating radiation in the range from around 2500 angstroms to one micron, i.e., those wavelengths for which the human tissue has a special affinity, at relatively high power continuously variable from about 10 to about 100 watts continuous wave power with extremely high power stability. While carbon dioxide and argon ion lasers, for example, are known which are capable of generating radiation having up to 100 watts continuous wave power, such devices do not possess the precise power stability required and are further limited by the available wavelengths of the radiation generated.

In the communications field, lasers are theoretically well suited for both modulated carrier wave and pulse code modulated signalling applications that have not been extensively employed to date due to similar limitations: viz. power instability and the unavailability of radiation of specific wavelengths at which optimal transmission through the atmosphere, water or other media is attained. In addition, mobile signalling applications are presently impractical with known high power lasers, such as carbon dioxide gas lasers, due to their relatively large size and sensitivity to shock.

In addition to the above deficiencies, all known lasers are relatively inefficient in operation, with a maximum efficiency of 15–20 percent being typical.

Efforts to provide lasers which do not suffer from the above known disadvantages have included the suggestion of designing electron impact excitation lasers in articles by W. R. Bennett and G. Gould in *Applied Optics Supplement,* Volume 2, pages 3 and 59, respectively; direct electronic ion excitation lasers in articles by P. K. Tien et al, in *Physical Review Letters,* Volume 7, page 159; and direct electron excitation of molecular states in articles by R. W. Waynant *Physical Review Letters,* Volume 28, page 533 and R. T. Hodgson et al in *Physical Review Letters,* Volume 28, page 536 and *Physics Letters,* Volume 38A, page 213. To date, however, such efforts have not led to the successful development of a monoenergetic electron impact laser capable of utility in wide variety of application, such as those noted supra.

SUMMARY OF THE INVENTION

This invention comprises a laser method and apparatus for producing continuous or pulsed coherent radiation at heretofore unattainable power levels, and at wavelengths covering the full spectrum from X-ray to infrared, the particular wavelength being tailored to meet the requirements of a given one of a wide variety of applications. The radiation is generated by the electron bombardment of atoms or molecules of substances at an energy at which negative ion-like states having an extremely short lifetime are formed. Particles in the negative ion-like state decay quickly to at least two energy states at differential rates, with decay to the upper energy state occurring at a rate sufficiently greater than decay from the negative ion-like state to the lower energy state to ensure population inversion. Atoms or molecules in the upper state decay to the lower state, emitting coherent radiation of a predetermined frequency and wavelength. The population inversion is maintained by exciting the particles comprising the substance to the short-lived ion-like state at a rate greater than the rate of decay from the ion-like state to the lower energy levels.

In the preferred embodiment, a gas laser cavity and an electron beam source are disposed within a sealed enclosure having an optical exit window transparent to the emitted radiation. The electron beam source is provided with a pair of control electrodes for controlling the energy of the emitted beam and for focusing the beam onto the gas within the cavity.

In operation, the electron beam generator is adjusted to provide a beam of substantially monoenergetic electrons having a predetermined energy which is focused onto the lasing medium within the cavity. The interaction of the electron beam with individual atoms and/or molecules of the lasing medium causes the initial excitation thereof to a relatively short lived negative ion-like state. After decay to at least two levels at differential rates which causes a population inversion, the atoms or molecules decay from the upper to a lower level state, thereby emitting coherent radiation of a predetermined frequency. The emitted radiation is then transmitted through the exit window for use in the intended manner depending on the particular application.

By selecting an appropriate lasing medium and an appropriate transition from an upper to a lower level, the frequency and wavelength of the radiation emitted can be preselected in accordance with the requirements of any given application. The power output of the emitted radiation is varied over wide limits by simply adjusting the current and cross section of the incident electron beam. Similarly, the laser can be operated in either a continuous or a pulsed mode by simply controlling the application of the incident electron beam in a corresponding fashion.

For a fuller understanding of the nature and advantages of the invention, reference should be had to the ensuing detailed description taken in conjunction with the accompanying drawings.

BRIEF DESCRIPTION OF THE DRAWINGS

FIG. 1 is a schematic diagram of the preferred embodiment of the invention;

FIG. 2 is an energy level diagram illustrating the principle of the invention;

FIG. 3 is an energy level diagram illustrating the operation of the invention with helium;

FIG. 4 is a schematic diagram of a system for determining the resonances required to excite a particular lasing substance to a short lived negative ion-like state; and FIG. 5 is an energy-waveform diagram for illustrating the operation of the FIG. 4 system.

DESCRIPTION OF THE PREFERRED EMBODIMENT

Turning now to the drawings, FIG. 1 illustrates schematically the preferred embodiment of the invention. A conventional gas laser cavity 10 is disposed within an enclosure 12 having an optical window 13. Laser cavity 10 comprises a sealed chamber formed by body portion 14 and a pair of end walls 15, 16. The inner surfaces of end walls 15, 16 are highly polished optical flats with a highly reflective surface, e.g. gold, silver or the like, which provides a high coefficient of reflectivity for light incident thereon. If desired, the inner reflective face of end wall 16, i.e., the output wall, can be made less reflective in accordance with known techniques to permit a greater percentage of the radiation incident thereto to be transmitted to window 13. Furthermore, if desired the cavity itself can be made spherical so as to make the radiation incident on the cavity wall at grazing incidences in order to reduce the absorption and so allow higher power levels. The interior volume of cavity 10 contains a suitable gas lasing medium at an appropriate relatively low pressure and temperature. For the example of helium, the pressure is preferably below $10^{-2}$ Torr and the initial temperature about 300° C.

Also located within enclosure 12, is an electron beam source 20 capable of generating a monoenergetic beam of electrons which is variable over a predetermined energy range. In addition to the conventional cathode and anode input leads schematically depicted by reference numerals 21, 22 beam source 20 is provided with a pair of control inputs, schematically depicted by arrowed input terminals 23, 24, which are coupled to first and second sources of high voltage $V_1$, $V_2$, via first and second adjustable control elements, 25, 26, respectively. Terminal lead 23 is coupled to a control grid in beam source 20 and provides continuously variable adjustment of the energy of the electron beam over a desired predetermined range.

Terminal lead 24 is coupled to the focusing electrodes in beam source 20 so that the width and divergence of the electron beam may be manually adjusted.

The interior of enclosure 12 is coupled to a suitable vacuum source (not shown) in order to provide an evacuated atmosphere in the region between the electron beam source 20 and laser cavity 10 to facilitate the transmission of the electron beam thereto.

Positioned adjacent exit window 13 is a conventional optical filter 27 which functions to block the transmission therethrough of all light other than that having the desired wavelength.

In operation, electron beam generator 20 is energized to provide a substantially monoenergenic beam of electrons having a desired width and divergence, the beam being selected in the manner described below by adjusting control elements 25, 26. The resulting electron beam strikes the gas atoms or molecules within laser cavity 10, which are excited to one or more extremely short-lived, predetermined ion-like resonance states and thereafter decay to several target states permitting generation of radiation characteristic of the energy separation between a preselected pair of such target states. Radiation traveling substantially parallel to the longitudinal axis of cavity 10 is reflected at the end walls 15, 16 and stimulates the emission of further radiation from other excited atoms or molecules. Once the intensity of the radiation has reached a certain level, it passes through end wall 16 and window 13. The output of window 13 is radiation of a preselected wavelength.

FIG. 2 is an energy level diagram illustrating the principle of operation of the invention. In this Fig., the lowermost horizontal line labeled A(G) represents a bound state of the atom or molecule comprising the gas in laser cavity 10, while $A^-(R)$ represents the energy level of the same atom or molecule in the preselected short lived resonant, ion-like state. The vertical arrow labeled $E_R$ represents the energy required to raise the atom or molecule from the bound state to the resonant ion-like state. A*(U) and A*(L) represent the energy levels of a pair of states to which transition from the short lived ion-like state $A^-(R)$ is permissible in accordance with quantum mechanical principles and between which transitions are likewise permissible under quantum mechanical principles.

When an electron of energy $E_R$ collides with an atom the latter is raised to the negative ion-like level $A^-(R)$ which is extremely short lived relative to the mean lifetime of the atom in states A*(U) and A*(L). From the ion-like state $A^-(R)$ the atom decays both to states A*(U) and A*(L) at rates $R_U$, $R_L$, respectively. Atoms transitioning to the A*(U) state subsequently make a transition to the A*(L) state. From the A*(L) state, the atoms make the transition to the A(G) state.

Population inversion, and thus lasing action, is insured if the lifetime of an atom in the $A^-(R)$ state is extremely short relative to the lifetime of the atom in the remaining states and if the rate of decay $R_U$ from the $A^-(R)$ state is greater than the rate of decay $R_L$ from the $A^-(R)$ state to the A*(L) state. Under these conditions, the preponderance of emitted radiation when atoms make the transition from the A*(U) state results in the stimulated emission of radiation having a wavelength determined by the difference between these two energy levels. It should be understood that there may be several states between the A*(L) and the A(G) state to which the atoms may make a transition from the A*(L) state.

FIG. 3 is an energy level diagram illustrating the mode of operation of the invention with helium as the lasing medium. In this illustration, the helium $2^1P$ state corresponds to the A*(U) state and the $1^1S$ state corresponds to the ground state. The gas is irradiated with an electron beam having an energy of 50 electron volts required to raise an atom of helium from the $1^1S$ state to a short lived He$^-$ state. This latter state, which is extremely short lived (on the order of about $10^{-14}$ to $10^{-16}$ second), decays to both the $2^1P$ and $1^1S$ states. The decay from the He$^-$ state into the former state occurs at the rate of approximately five times that of the rate of decay from the He$^-$ state to the latter state. Thus, population inversion between the $2^1P$ and $1^1S$ states is ensured. As the various atoms decay from the $2^1P$ to the $1^1S$ states, radiation having a wavelength of about 584 angstrom units is emitted. Thus, operation of the invention with helium in the manner described results in the generation of coherent light in the VUV region.

The same result may also be obtained by bombarding metastable helium atoms in the $2^3S$ state with an electron beam having an energy of 30.2 electron volts to raise an atom of helium from this state to the extremely short lived He$^-$ state. In addition, other transitions than the $2^1P$-$1^1S$ transition may be selected, as desired to produce radiation having other wavelengths than that noted above.

As will be apparent to those skilled in the art, many substances such as nitrogen, carbon monoxide, carbon dioxide, exist for which population inversion, and thus lasing action, in accordance with the invention is achieved. In general, selection of the lasing medium is primarily dependent upon the desired wavelength of the emitted radiation, the availability of resonant negative ion-like states of the required extremely short life with branching ratios for decay to the upper and lower states A*(U), A*(L) such as to ensure population inversion. It should be noted that at present, the phenomenon of the short lived states to which the lasing medium is raised by electron bombardment is not completely understood and is a current subject of much theoretical debate. Some physicists regard the phenomenon as a scattering interference between the bombarding electrons and the target; others, including the inventors, envision the phenomenon as an actual formation of an extremely short lived negative ion state or a state which closely resembles such a state. The term "negative ion-like state" is employed herein to signify such short lived states which are evidenced by relatively broad resonances i.e., resonances with widths in the range from about 0.25 to about 5 eV, encountered when a given substance is bombarded with an electron beam. Stated differently, the total excitation cross-section must possess a "bump" of sufficient magnitude that the excitation cross-section in the vicinity of the bump is larger than the de-excitation cross section. For a mathematical analysis of this phenomenon, reference should be had to the article "Structures in Electron Impact Excitation Cross Sections of He From 30 to 70 eV", *Physical Review Letters,* Volume 31, page 1161 (1973), and the article "Negative Ion Lasers" *Applied Physics Letters,* Volume 24, No. 12, p. 618 (June 15, 1974), both authored by the inventors and the disclosures of which are hereby incorporated by reference.

FIG. 4 illustrates a system for determining the required broad resonances of a given gaseous substance and the optical emission spectra available from that substance. A vacuum system generally designated by reference numeral 40 and having an optical window 41 encloses an electron beam source generally designated by reference numeral 42, a control electrode 43, a conventional gas cell 44, and a conventional electron multiplier 45. Gas cell 44 is provided with a gas inlet conduit 46 coupled via a conventional leak valve 47 to a source of the gaseous substance (not illustrated) to be analyzed. Gas cell 44 is further provided with an electron beam inlet aperture 49 and outlet aperture 50 so that an incident beam of electrons may pass through cell 44 and encounter electron multiplier 45. An optical window 51 is provided in one wall of gas cell 44 in alignment with window 41 so that the emission resulting from interaction of the electron beam with the gas in cell 44 is transmitted externally of vacuum system 40 and focused by lens 53 onto the entrance slit 54 of a conventional monochromator 55. Light radiation passing through monochromator 55 exits via a slit 56 to a conventional photomultiplier 57, which generates an electrical output signal whose amplitude is proportional to the incident radiation.

A master clock oscilltor 60 is provided for generating a square wave clock signal train having a frequency $f_0$ which is coupled to a first input of a mixer 61 and also to the input of a conventional frequency divider 62. The output of frequency divider 62 is a square wave train having a frequency $f_0/N$, N an integer, and is coupled via a conventional attenuator 64 to a second input of mixer 61. The output signal from mixer 61 is used to control the operation of control grid 43 in the manner described below.

The output of frequency divider 62 is also coupled to a first comparator input of a phase detector 66, the input of a conventional counter 67 and the control gate of a pair of conventional multi-channel analyzers 68, 69. Multi-channel analyzers 68, 69 count the number of incident pulses coupled to the input thereof which lie within a predetermined amplitude range, the amplitude range being incrementable in accordance with the output from pulse counter 67. In addition, multi-channel analyzer 69 is provided with a horizontal drive output terminal 70 which is coupled to electron beam source 42 via a DC amplifier 72 in order to control the energy of the electron beam generated thereby. The output of DC amplifier 72 is also coupled to the X input of a conventional X-Y recorder 74, the latter element having the Y input thereof connected to the output of phase detector 66.

The output of electron multiplier 45 is coupled via a current-to-voltage converter 76 to the remaining input of phase detector 66.

The output of photo multiplier 57 is coupled via a conventional amplitude discriminator 78 to the start input of a time-to-amplitude converter 80 and also to the input of multi-channel analyzer 68. The output of time-to-amplitude converter 80 is coupled to the input of multi-channel analyzer 69.

Time-to-amplitude converter 80 produces an output signal whose magnitude is proportional to the time between the occurrence of a start pulse and a stop pulse. The stop pulse is generated by master clock 60 and is delayed by a predetermined amount by means of a conventional delay generator 82 for the purpose described below.

In operation, the magnitude of the electron beam energy is initially determined by the initial state of multi-channel analyzer 69. The output signal trains from master clock 60 and frequency divider 62 are combined in mixer 61 to pulse the control grid 43 in the manner shown in FIG. 5. As shown in this FIG., the electron beam is modulated at frequency $f_0$ during a first time period $t_1$ between cutoff and a first threshold energy $E_A$, after which the beam is modulated for a second time period $t_2$ between cutoff and a second threshold energy $E_B$. During $t_1$ electrons having energy lying below $E_A$ are blocked from transmission to gas cell 44; similarly, during period $t_2$ electrons having an energy less than $E_B$ are blocked from transmission to gas cell 44. The beam is thus modulated in alternate cycles between the two extremes in order to obtain an energy distribution lying in a predetermined narrow range shown in the Fig.

The thus-modulated electron beam enters gas cell 44 via entrance aperture 49, passes through the gas and interacts therewith, exits via exit aperture 59 and is collected by electron multiplier 45. The signal output from this latter element is coupled via voltage converter 76 to phase detector 66. Whenever coincidence exists between the output signal from converter 76 and the $f_0/N$ clock signal train from frequency divider 62, a signal is generated which is recorded on the ordinate axis of recorder 74 while the signal recorded on the abscissa axis corresponds to the average energy of the generated electron beam.

Concurrently with the developing electron transmission spectrum recorded on recorder 74, the photons emitted by the interaction of the electron beam with the gas in cell 44 are transmitted through monochromator 55 to photomultiplier 57. The resulting electrical signals generated by photomultiplier 57 are coupled via amplitude discriminator 78 to the input of multi-channel analyzer 68 which records all photons resulting from the excitation. The signal is also coupled through the time-to-amplitude converter 80 to the input of multi-channel analyzer 69, which records photons which occur after a predetermined time delay set by delay unit 82. This measures the various lifetimes contributing to the decay of the particular state being studied, the latter being determined by adjusting monochromator 55 to transmit photons having a particular wavelength. Multi-channel analyzers 68, 69 are stepped through the various channels by the output of counter 67 clocked by the $f_0/N$ output signal train from frequency divider 62.

By measuring the magnitude of the optical emission of the delayed photons, the resonances of interest, viz. those electron beam energies which result in the formation of the above-noted short lived temporary negative ion states are determined for a particular wavelength of interest. This information is then used to set the electron beam energy of the FIG. 1 device in order to produce optimum emission for the particular lasing substance of interest.

As will now be apparent, lasers constructed in accordance with the principles of the invention provide coherent radiation of wavelengths heretofore unattainable with known devices. Further, since the intensity of the emitted radiation is dependent upon the electron beam current density, the power output of such devices can be varied in a continuous manner over a relatively wide range by simply adjusting the beam strength. In addition, lasers constructed in accordance with the invention can be designed to operate in either a continuous or a pulse mode by simply controlling the application of the electron beam to the lasing medium to provide continuous or interrupted bombardment.

While the above provides a full and complete disclosure of the invention, various modifications, alternate constructions and equivalents may be employed without departing from the true spirit and scope of the invention. Therefore, the above description and illustrations should not be construed as limiting the scope of the invention, which is defined by the appended claims.

What is claimed is:

1. An atomic and molecular resonance laser apparatus for generating electromagnetic energy comprising:
   an optically resonant cavity;
   a target substance located in said cavity and having a plurality of particles excitable to a relatively short-lived resonant state characterized by a relatively broad resonance of width in the range from about 0.25 to about 5eV and having an upper and lower energy state to which individual particles decay from said resonant state, the rate of decay to said upper state being greater than the rate of decay to said lower state, said particles being capable of transition from said upper to said lower energy states to generate said electromagnetic energy, the mean lifetime of said upper and said lower states being greater than the mean lifetime of said resonant state; and
   means for exciting said individual particles to said relatively short-lived resonant state at a rate greater than the rate of decay of said particles from said resonant state to produce a population inversion between said upper and lower energy states, said exciting means including an electron beam generator for generating an electron beam having a predetermined energy distribution centered about said resonance characterizing said resonant state with a width no greater than substantially the width of said resonance, and means for directing said electron beam onto said target substance.

2. The combination of claim 1 wherein said target substance comprises a gas.

3. The combination of claim 2 wherein said gas is helium and said electron beam energy distribution is centered about 50eV.

4. The combination of claim 2 wherein said gas is helium and said electron beam energy distribution is centered about 30.2eV.

5. A method for generating electromagnetic energy from a target substance having a plurality of particles excitable to a relatively short-lived resonant state characterized by a relatively broad resonance of width in the range from about 0.25 to about 5eV, said substance having upper and lower energy states to which individual particles decay from said resonant state, the rate of decay to said upper state being greater than the rate of decay to said lower state, said particles being capable of transition from said upper to said lower energy states to generate said electromagnetic energy, the mean lifetime of said upper and said lower states being greater than the mean lifetime of said resonant state, said method comprising the steps of positioning said target substance in an optically resonant cavity, and exciting said individual particles to said relatively short-lived resonant state at a rate greater than the rate of decay of said particles from said resonant state to produce a population inversion between said upper and said lower energy states, said step of exciting including the steps of:
   generating an electron beam having a predetermined energy distribution about said resonance characterizing said resonant state; and directing said electron beam at said target substance.

6. The combination of claim 5 wherein said target substance comprises a gas.

7. The combination of claim 6 wherein said gas is helium and said electron beam energy distribution is centered about 50eV.

8. The combination of claim 6 wherein said gas is helium and said electron beam energy distribution is centered about 30.2eV.

* * * * *